United States Patent [19]

Brancati

[11] Patent Number: 4,837,815
[45] Date of Patent: Jun. 6, 1989

[54] ARMORED CORD HANDSET

[75] Inventor: Rudolf P. Brancati, Richmond Hill, N.Y.

[73] Assignee: Nynex Corporation, New York, N.Y.

[21] Appl. No.: 879,085

[22] Filed: Jun. 26, 1986

[51] Int. Cl.⁴ .................. H04M 1/15; H04M 1/03; H04R 1/06

[52] U.S. Cl. .................. 379/438; 379/428; 379/433; 439/451

[58] Field of Search .................. 174/69 R, 70 R, 73 R, 174/75 F, 40 TD, 45 TD, 102 R, 109; 379/428, 433, 437, 438, 451; 439/447, 448, 449, 451, 474, 816, 840, 841

[56] References Cited

U.S. PATENT DOCUMENTS

| 454,486 | 6/1891 | Lieb | 174/45 TD |
| 896,700 | 8/1908 | Atwood | 174/105 R |
| 2,220,393 | 11/1940 | Bylander | 174/70 R |
| 3,290,429 | 12/1966 | Prescott et al. | 174/102 R |
| 3,377,442 | 4/1968 | Foster, Jr. | 379/438 |
| 3,674,915 | 7/1972 | Pritchard | 174/102 R |
| 3,917,369 | 11/1975 | Sevec et al. | 174/69 |
| 4,130,740 | 12/1978 | Cogan | 379/433 |
| 4,178,490 | 12/1979 | Boenecke | 379/433 |
| 4,259,544 | 3/1981 | Litauer | 174/102 R |
| 4,319,095 | 3/1982 | Cogan | 379/433 |
| 4,518,830 | 5/1985 | Drexler et al. | 379/438 |

FOREIGN PATENT DOCUMENTS

| 502780 | 8/1979 | Australia | |
| 668040 | 11/1938 | Fed. Rep. of Germany | 174/40 TD |
| 608909 | 1/1979 | Switzerland | 174/69 |

Primary Examiner—Jin F. Ng
Assistant Examiner—Randall P. Myers
Attorney, Agent, or Firm—Robin, Blecker & Daley

[57] ABSTRACT

An armored cord and handset wherein the strength member of the armored cord is secured to the handset through resilient means and the sheath member of the armored cord is secured to the handset via a securing member which is provided with reinforcing means.

27 Claims, 2 Drawing Sheets

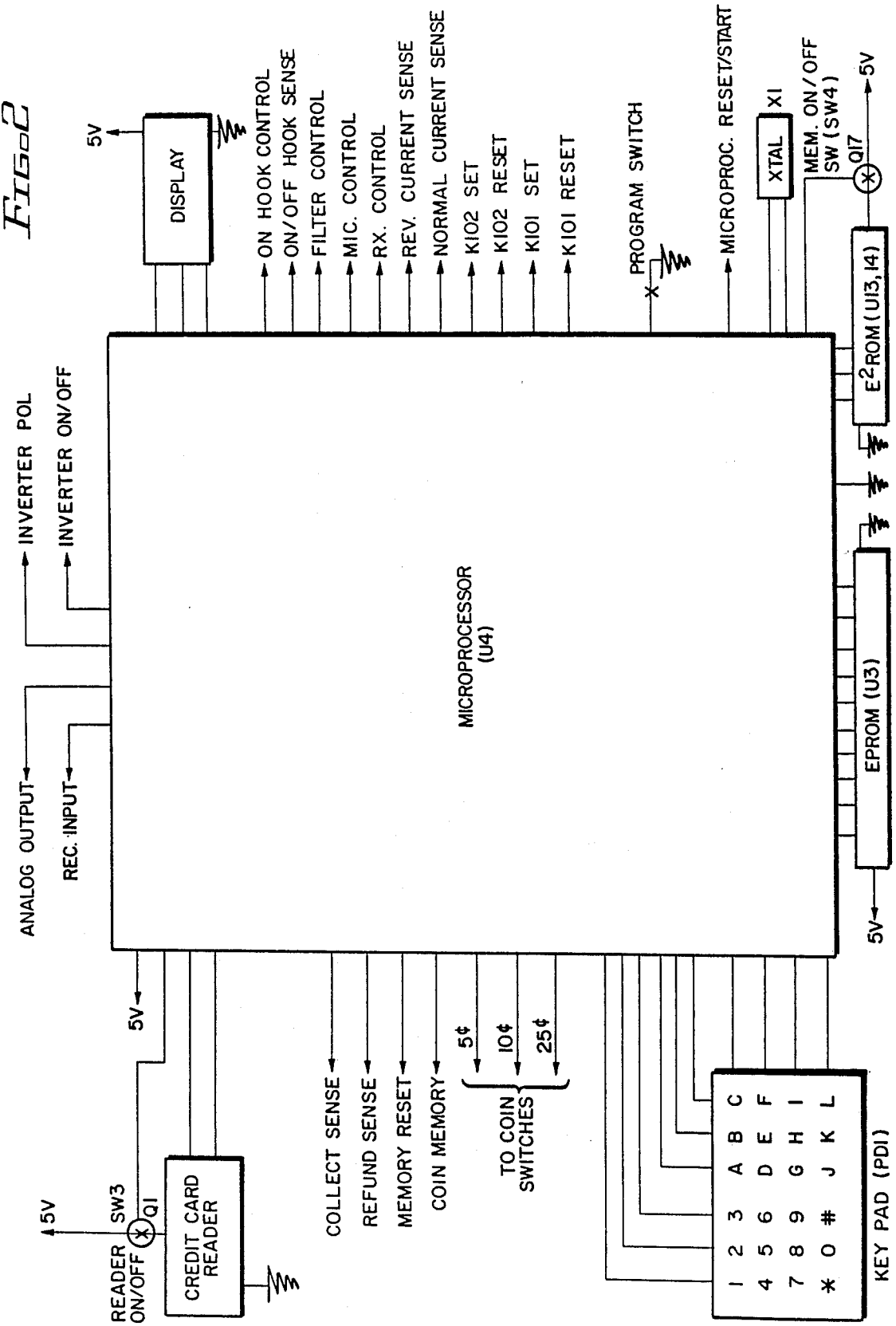

ARMORED CORD HANDSET

Background of the Invention

The invention relates to telephone apparatus and, in particular, to armored cord and handsets used in public telephone stations.

The standard handset for public telephone stations utilizes an armored cord to connect the telephone handset to the telephone housing. The armored cord includes an outer armored sheath member which provides flexibility to the cord and an inner strength member or lanyard which runs throughout the length of the sheath. The ends of the strength member extend beyond the capped ends of the sheath and are terminated in swaged end terminations which are of larger diameter than the strength member. These swaged end terminations provide longitudinal tensile strength to the respective connections between the armored cord and handset and the armored cord and telephone housing.

More particularly, the armored cord enters the handset through a grommet located at the transmitter end of the set. Just forward of the grommet, the sheath member of the cord is secured to the set via a plastic U-shaped member situated on the top surface of the transmitter cap. The sheath is crimped at the location of entry into the U-shaped member and the shoulders formed by the crimp abut the outer surfaces of the legs of the U-shaped member, thereby preventing longitudinal movement of the sheath.

The strength member continues from the capped end of the sheath member in the transmitter section through the yoke section of the handset to the receiver section. At the receiver section a wedge-shaped member is provided to secure the strength member. The wedge shaped member is held in the handset by extending its tapered section slightly into the yoke section of the handset. The wedge-shaped member is further provided with axially aligned slots of first and second diameter extending throughout its length. The first slot receives the strength member and the second slot is sized to receive the swaged end termination. The latter slot thereby provides a stop surface extending orthogonally of the first slot and prevents disconnection of the strength member and, therefore, the armored cord from the handset.

While the above-described armored cord provides adequate connection between the telephone housing and handset during normal use of the telephone station, certain problems have arisen where extreme longitudinal forces are applied to the handset. Thus, it has been found that if the armored cord is wrapped around one hand and the handset held stationary in the other hand, sufficient force can be applied to the cord to cause the sheath member to pull through the plastic U-shaped retaining member on the receiver cap. This, in turn, allows the telephone lines in the cord to be pulled beyond the grommet and, thus, become exposed which is highly undesirable. Furthermore, where forces which exceed about 400 pounds are exerted on the strength member by pulling the handset cord, it has been found that the wedge-shaped member holding the strength member is driven through the plastic yoke portion, of the handset. This, in turn, causes the handset to crack into two pieces, thereby rendering the handset useless.

Various attempts have been made to at least overcome the problem of the sheath member pulling through the U-shaped retaining member on the receiver cap. One attempt involved providing a C-ring at the junction of the rubber grommet and the sheath of the armored cord. An extension of this approach was to utilize an adhesive, such as epoxy, around the C-ring to secure it to the armored cord. Neither of these techniques proved successful as the C-ring was incapable of withstanding the stress and the epoxy was temperature sensitive and would break. A final approach was to utilize a thick plastic retainer having an aperture through which the armored cord was passed and which encapsulated a U-shaped metal insert. Using this technique, however, the retainer piece had to be threaded along the armored cord until the retainer reached its desired position. Threading of the retainer turned out to be a time consuming process and made the use of the retainer undesirable.

Thus, none of the attempts to date have provided a viable way to prevent the sheath of the armored cord from being pulled from the handset. Furthermore, no attempt has been made to provide a mechanism for preventing cracking of the handset under extreme stress.

It is, therefore, an object of the present to provide an armored cord and telephone handset which do not suffer from the aforementioned disadvantages.

It is a further object of the present invention to provide an armored cord and telephone handset which are adapted to prevent the telephone lines servicing the handset from being exposed.

It is yet a further object of the present invention to provide an armored cord and telephone handset which resist cracking of the handset upon the armored cord being subjected to extreme longitudinal forces.

SUMMARY OF THE INVENTION

In accordance with the principles of the present invention, the above and other objectives are realized in the combination of an armored cord and telephone handset by utilizing a resilient member or means to connect the strength member of the cord to the handset. The resilient means is situated between the swaged end termination of the strength member and a stop means disposed in the region of the receiver and yoke portions of the handset. The resilient means is further adapted to absorb a large portion of the longitudinal force developed when the handset is yanked or pulled longitudinally, thereby preventing the handset from rupturing.

In further accord with the invention, a reinforcing means is associated with the U-shaped retaining member securing the end of the sheath of the armored cord in the transmitter section of the handset. This reinforcing means strengthens the retaining member and prevents the sheath from being drawn through the member when the armored cord is pulled longitudinally. Exposure of the telephone lines in the cord is thereby prevented.

In the embodiment of the invention disclosed hereinafter, the resilient means comprises a heavy metal spring those turns encircle the section of the strength member forward of the swaged end termination. A retainer clip serves as the stop means and is force fit into the yoke and receiver sections of the handset. An end wall of the clip extends laterally and is provided with an aperture through which the strength member is passed. The spring, which surrounds the strength member portion beyond the aperture in the direction of the receiver section, is of larger diameter than the aperture and of equal or lesser diameter than the swaged end termination. The spring thus abuts at one end the end wall portion adjacent the aperture and at its other end the swaged end termination. The clip further comprises side walls which run longitudinally from the lateral ends of the end wall and whose lower surfaces follow the contour of the yoke section lower wall.

In this embodiment, the reinforcing means provided to the transmitter cap is in the form of a metal clip having the configuration of the U-shaped retaining member. The clip fits over the latter member and provides the needed added strength.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1A:
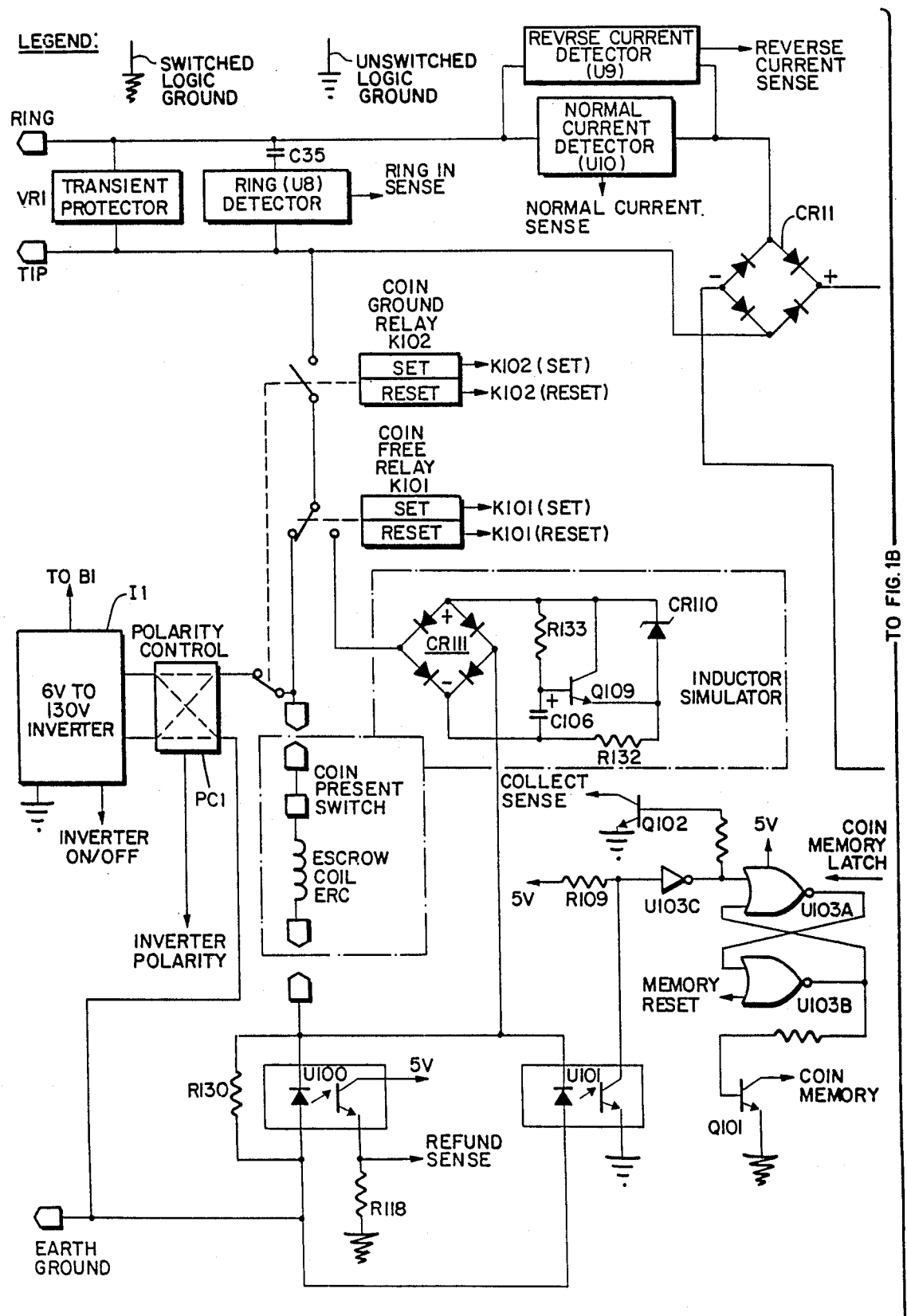
FIG. 1 is a perspective view of a public telephone utilizing an armored cord and handset in accordance with the principles of the present.
Figure 1B:
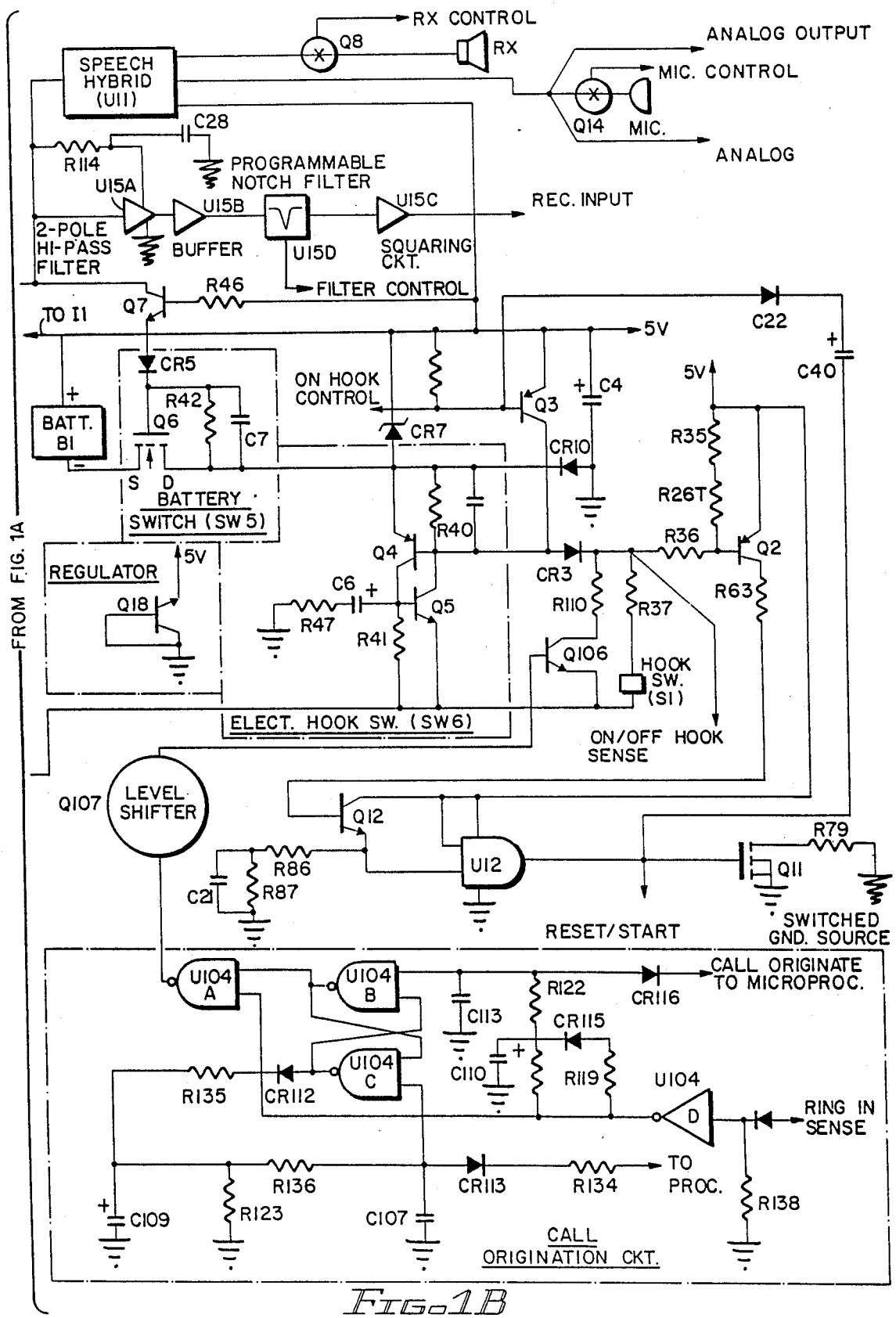
Figure 1:
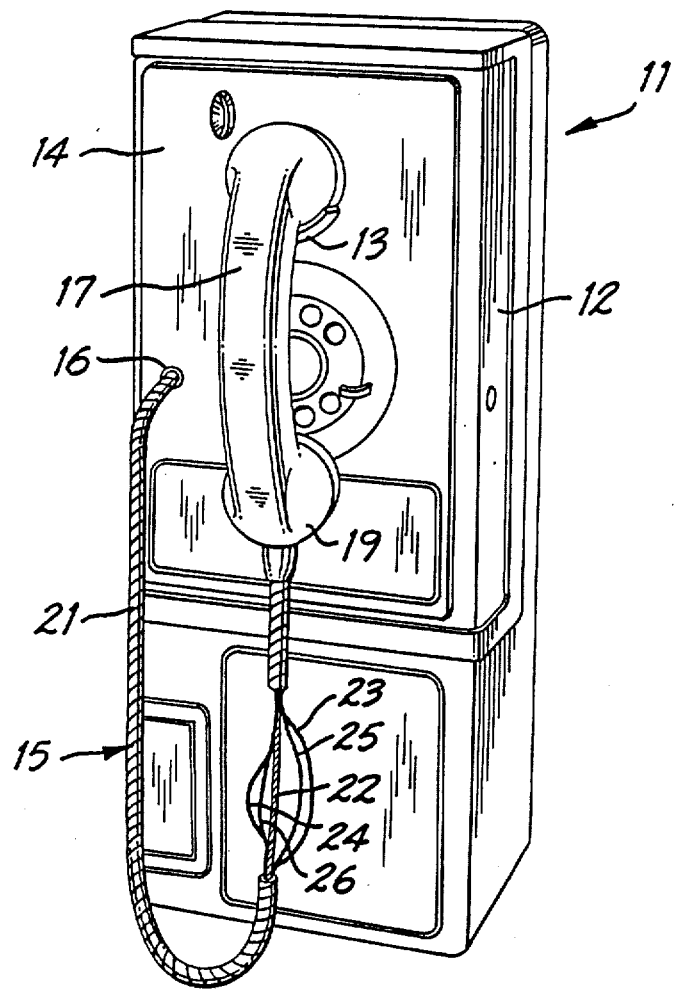

In FIG. 1, a housing 12 for a public telephone 11 supports a switchhook 13 which is located on a front panel 14 of the housing. The housing 12 also supports a handset 17 which is connected to the housing via an armored cord 15. The armored cord 15 extends through the opening 16 located on the front panel 14 of the housing 12 to the lower transmitter end 19 of the handset 17.

The armored cord 15 is of conventional type and, as shown in FIG. 1, comprises an armored, flexible outer sheath member 21. Extending within the sheath member 21 between the housing 12 and handset 17, is a longitudinal strength member 22. The strength member 22 is typically formed of a plurality of twisted wires which could, for example, be made of stainless steel of some other strong material, and which results in a breaking strength for the member which exceeds about 800 pounds. The armored cord 22 also carries a plurality of insulated interior conductors 23–26 for carrying electrical signals between the housing 12 and the handset 17.

While the combination of sheath member 21 and strength member 22 provides both flexibility and strength in connecting the handset 17 to the telephone housing 12, it is still possible in existing constructions of this type by applying high longitudinal forces to the armored cord to expose the electrical wires 23–26 and in some cases, to even break the handset 17. In accordance with the principles of the present invention, these undesirable effects are avoided by utilizing an improved mechanism for securing the sheath member 21 and the strength member 22 to the handset 17.

Figure 2:
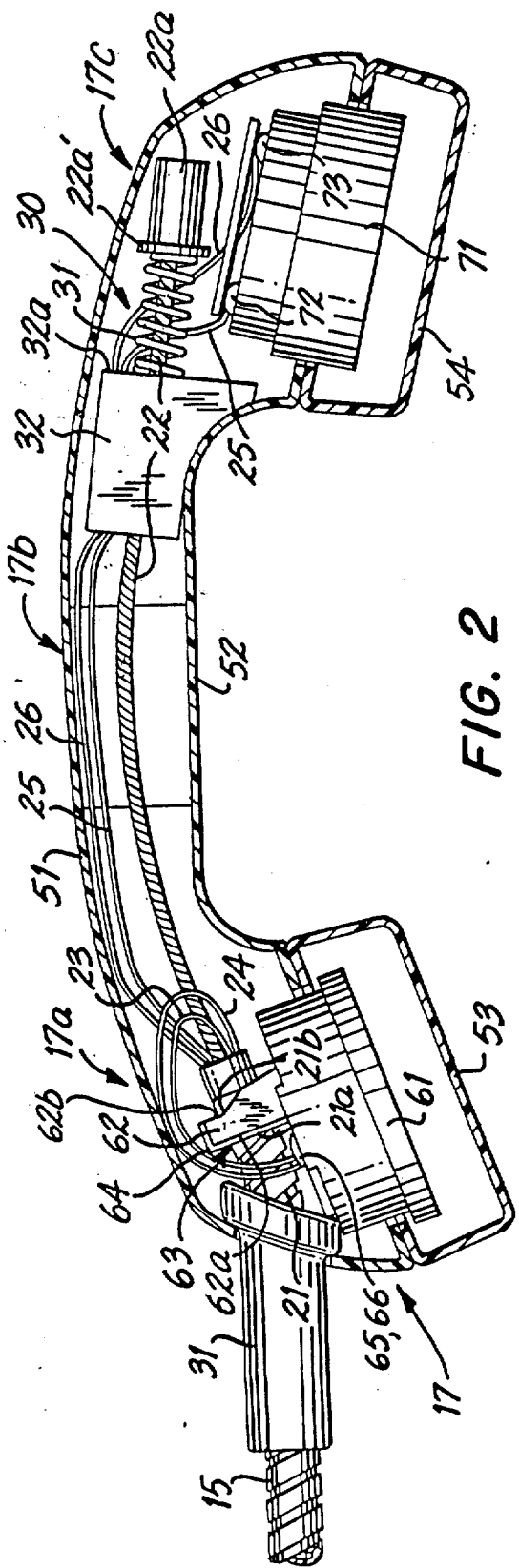
FIG. 2 is a schematic cross-section of the armored cord and handset of FIG. 1 illustrating the details of mechanism for connecting the cord to the handset.
Figure 3:
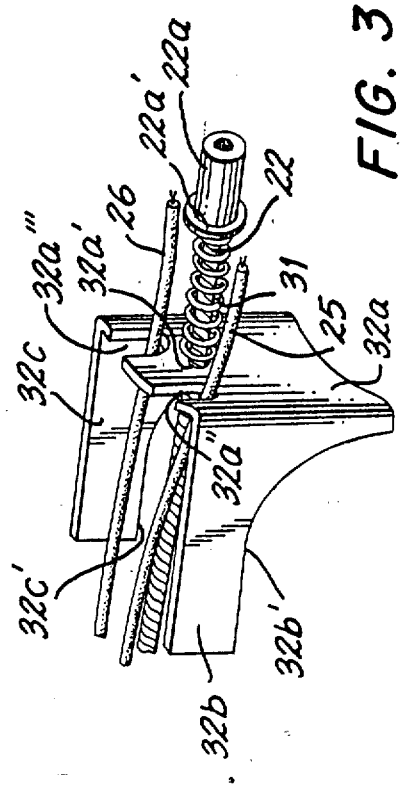
FIG 3 illustrates in greater detail the securing means for the strength member of the armored cord of FIGS. 1 and 2.
Figure 4:
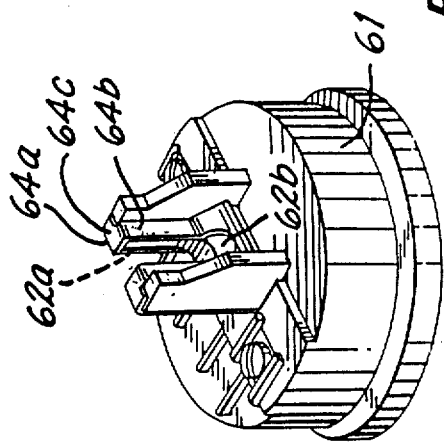
FIG. 4. illustrates in greater detail the transmitter housing and the reinforcing means for the sheath securing means of the housing of the handset of FIGS. 1 and 2.

More particularly, referring to FIGS. 2-4, the armored cord 15 enters the handset 17, which is defined by upper and lower walls 51 and 52 and transmitter and receiver end caps 53 and 54, via a grommet 31 situated at the transmitter section 17a of the handset. The sheath member 21 of the armored cord and the conductors 23 and 24 terminate and are secured in this section of the handset. The strength member 22 and conductors 25 and 26, in turn, continue through the yoke 17b of the handset to the receiver section 17c and are secured at this location.

The securing means 30 for the strength member 22 comprises a resilient means in the form of a spring 31 whose turns surround the strength member 22 in the region thereof immediately forward of the swaged end termination 22a. The latter is of larger diameter than the strength member 22 and of equal or larger diameter than the spring 31 so that its end surface 22a' pushes against the spring 31 upon longitudinal force being applied to the strength member.

A stop member in the form of a retaining clip 32 bridges the yoke and receiver sections 17b and 17c and when force fit in place in the handset is spaced from the swaged end termination 22a by the length of the spring 31. As a result, the clip 32 inhibits longitudinal movement of the spring. When the spring 31 is thereby urged longitudinally by the end surface 22a', due to longitudinal force on the strength member 22, the spring is compressed and acts to absorb the force or shock caused by this movement. The overall effect of the spring 31 and the retaining clip 32 forming the securing means 30 for the strength member 22 is thus to absorb large longitudinal forces applied to the strength member. Rupturing of the handset found to occur in handsets utilizing conventional securing means for the strength member is thereby eliminated.

FIG. 3 shows the securing means 30 in somewhat greater detail and, as shown, the clip 32 of the means 30 comprises a laterally extending curved end wall 32a and flat longitudinally extending side walls 32b and 32c. The side walls 32b and 32c extend from the lateral ends of the end wall 32a and have lower surfaces 32b' and 32c' contoured to follow the curved region formed by the bottom wall 52 of the yoke and receiver sections 17b and 17c of the handset 17. The end wall 32a of the clip 32 is provided o with an aperture 32a' for passage of the strength member 22. The portions of the wall 32a adjacent the aperture 32a' abut the spring 31 and act as the stop surface for the spring.

The end wall 32a at its upper edge is also provided with slots 32a'' and 32a''' which serve as passages for the conductors 25 and 26. These conductors terminate at terminals 72 and 73 on receiver housing 71.

As above-indicated, when the armored cable 15 and accompanying securing means 30 are introduced into the handset 17, the clip 32 becomes wedged or forced-fit into the yoke and receiver sections 17b and 17c of the handset, such that the spring 31 abuts the wall 32a of the clip and the wall 22a' of the swaged end termination 22a of the strength member 22. The strength member 22 is thus secured in place in a resilient manner, thereby accommodating the application of excessive longitudinal forces to the armored cord 15 and handset 17 without breaking of the handset.

As above-noted, the sheath member 21 of the armored cord 15 and the conductors 23 and 24 terminate in the transmitter section 17a of the handset 17. In the case of conductors 23 and 24, they are connected to terminals 65 and 66 situated on a transmitter housing 61. The sheath member 21, in turn, is secured to the housing 61 via a generally U-shaped plastic member 62 disposed on the top surface of the housing.

The sheath member 21 is crimped in the region which enters between the legs of the member 62. The shoulders 21a and 21b in the sheath member created by the crimp thereby engage with the back and front walls 62a and 62b of the member 62 to prevent longitudinal movement of the sheath. In accordance with the principles of the present invention, the degree of longitudinal force to which the plastic member 62 can be subjected without fatiguing is significantly increased by the addition of a reinforcing means 63 to the member.

More particularly, as shown in greater detail in FIG. 4, the reinforcing means 63 comprises a steel cup clip 64 having U-shaped back and front sections 64a and 64b and a connecting shoulder section 64c. The back section 64a follows the flat surface contour of the back wall 62a of the member 62, while the front section 64b follows the angled contour of the front wall 62b of the member 62. The clip 64 thus fits snugly over the U-shaped member 62 with the back section 64a abutting the back wall 62a of the member 62 and the front section 64b abutting the front wall 62b of the member. In this way the sections 64a and 64b provide steel reinforcement for the back and front plastic walls of the U-shaped member 62.

With the clip 64 situated on the member 62, the latter is now able to withstand longitudinal forces which, without the clip 64, would have resulted in rupture of the member 62 and, therefore, pulling of the sheath 22 sufficiently to expose wires 23–26. The reinforcement provided by the clip 62 thus inhibits the ability to cause exposure of the wires 23–26 by application of severe longitudinal forces to the sheath 21.

As can be appreciated, therefore, the present invention provides an armored cord and handset combination wherein overall interconnection of the sheath and strength member of the armored cord to the telephone handset is enhanced and improved. The invention thus offers an attractive means for preventing misuse and destruction of public telephone stations.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

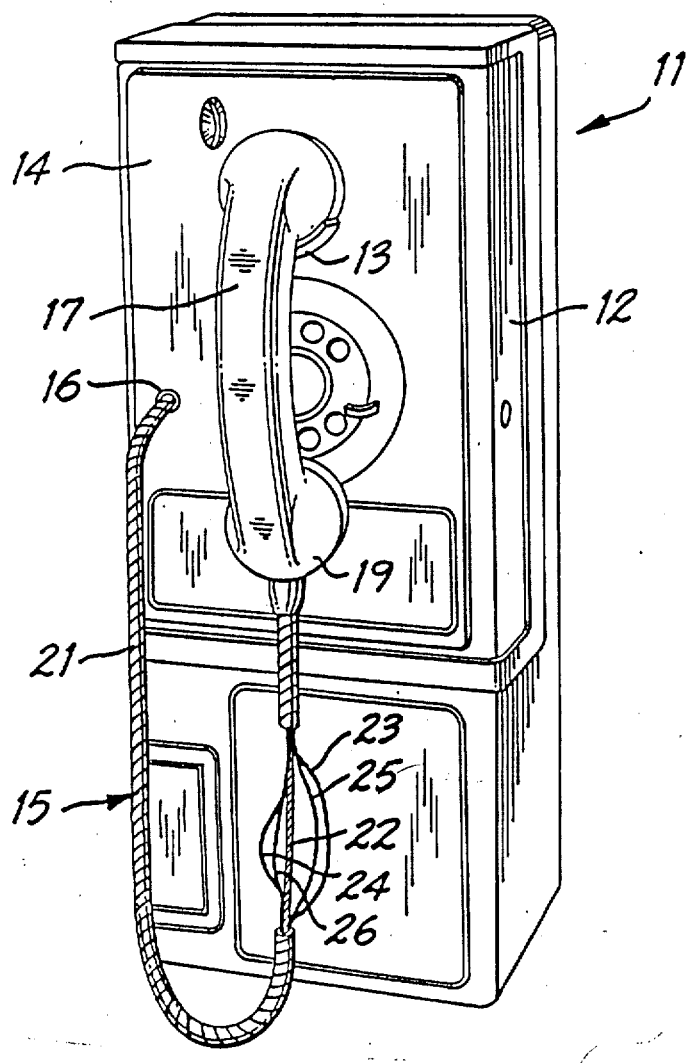

What is claimed is:

1. In combination:
  an armored cord for use in connecting a telephone handset to a telephone housing, the telephone handset having a receiver section, a transmitter section, a yoke section connecting the transmitter and receiver sections and means for securing the sheath member of an armored cord to the telephone handset, the armored cord comprising: a flexible, armored outer sheath member for extending between the telephone handset and the telephone housing; a strength member extending in the interior and over the length of the sheath member; and a number of conductors disposed within said sheath member for extending between the telephone handset and the telephone housing;
  and strength member securing means for securing the strength member to the telephone handset, said strength member securing means including resilient means for providing resilient engagement of the strength member with the strength member securing means.

2. The combination claimed in claim 1 wherein: said sheath securing means comprises a U-shaped means;
  and said combination further comprises means for reinforcing said U-shaped means.

3. The combination of claim 2 wherein:
  said U-shaped means comprises spaced legs; and
  said reinforcing means extends beyond the inner edges of said legs into the space between said legs.

4. The combination of claim 1 wherein:
  said strength member includes an end termination adapted to be situated in said handset;
  and said strength member securing means includes: a stop member adapted to be situated in said handset so as to engage said handset and be in spaced relationship to said end termination of said strength member;
  and said resilient means comprises a resilient member adapted to be situated in the space between said end termination and said stop member.

5. The combination of claim 4 wherein:
  said resilient member comprises a spring whose turns are situated around said strength member, said spring having a diameter adapted to cause abutting of said spring and said end termination;
  and said stop member includes: a retainer clip having a laterally extending end wall facing said spring and provided with an aperture of equal or smaller diameter than said spring through which said strength member passes, and first and second longitudinally extending side walls at the lateral ends of said end wall.

6. The combination of claim 5 wherein:
  said strength member is adapted to extend through said transmitter and yoke sections and terminate with said end termination in said receiver section of said handset when said strength member is inserted in said handset;
  and said stop member is adapted to bridge said yoke and receiver sections of said handset when said strength member is inserted into said handset, said stop member being force-fit and secured in aid yoke and transmitter sections when said strength member is inserted into said handset, whereby longitudinal forces applied to said strength member causes said end termination to compress said spring against said end wall of said clip thereby absorbing said longitudinal forces.

7. The combination of claim 6 wherein:
  said combination further comprises said telephone handset;
  and said strength member and strength member securing means are inserted in said handset.

8. The combination of claim 7 further comprising:
  a telephone housing connected to said armored cord.

9. The combination of claim 7 wherein:
  said sheath member terminates in said transmitter section;
  said sheath securing means is disposed in said transmitter section;
  and said combination further comprises: means for reinforcing said sheath securing means.

10. The combination of claim 9 wherein:
  said transmitter section includes a transmitter housing;
  said sheath securing means includes a securing member situated on said transmitter housing;
  and said reinforcing means reinforces said securing member.

11. The combination of claim 10 wherein:
said securing member has front and back walls;
and said reinforcing means reinforces said front and back walls of said securing member.

12. The combination of claim 11 wherein:
said securing member is generally U-shaped and said sheath member is secured between the legs of said U-shaped securing member;
and said reinforcing means comprises a cup clip having a U-shaped front section, a U-shaped back section and a shoulder section connecting the top ends of said U-shaped front and back section, said clip being fastened over said securing member so that said U-shaped front and back sections abut the front and back walls of said U-shaped securing member.

13. The combination of claim 12 wherein:
said U-shaped securing member is formed of plastic;
and said U-shaped cup clip is formed of a material of higher strength than said plastic.

14. The combination of claim 13 wherein:
said cup clip is formed from steel.

15. The combination of claim 12 wherein:
the U-shaped front and back sections of said cup clip extend beyond the inner edges of said legs of the U-shaped securing member into the space between said legs.

16. The combination of claim 6 wherein
said first and second side walls of said retainer clip extend forwardly of said end wall in a direction away from said spring.

17. The combination of claim 16 wherein:
the lower ends of said first and second side walls engage and follow the contour of the lower walls of said yoke and receiver sections.

18. The combination of claim 17 wherein:
the lower walls of said yoke and receiver sections are curved;
and the lower ends of the first and second walls are curved to follow the curvature of the lower walls of the yoke and receiver sections.

19. In combination:
a telephone handset for use with a telephone station and with an armored cord which connects the telephone handset to the telephone station, the armored cord including a flexible, armored outer sheath member; a strength member extending in the interior and over the length of the sheath member; and a number of conductors disposed within the sheath member for extending between the telephone handset and telephone station, the telephone handset including: a transmitter section comprising a transmitter housing; a U-shaped securing member situated on said housing and having legs adapted to secure said sheath member to said handset, said U-shaped securing member having front and back walls; and means for reinforcing said front and back walls of said U-shaped securing member comprising: a cup clip having a U-shaped front section, a U-shaped back section and a shoulder section connecting the top ends of said U-shaped front and back sections, said cup clip being fastened over said securing member so that said U-shaped front and back sections abut the front and back walls of said U-shaped securing member;
and means adapted to secure the telephone handset to the strength member.

20. The combination of claim 19 wherein:
said strength member securing means comprises resilient means for providing resilient engagement of said strength member with said strength member securing means.

21. The combination of claim 19 wherein: said U-shaped securing member is formed of plastic;
and said U-shaped cup clip is formed of a material of greater strength than said plastic.

22. The combination of claim 21 wherein: said cup clip is formed from steel.

23. The combination of claim 19 wherein:
the U-shaped front and back sections of said clip extend beyond the inner edges of the legs of the U-shaped securing member into the space between said legs.

24. In combination:
a telephone handset for use with a telephone station and with an armored cord which connects the telephone handset to the telephone station, the armored cord including a flexible, armored outer sheath member; a strength member extending in the interior and over the length of the sheath member; and a number of conductors disposed within the sheath member for extending between the telephone handset and telephone station, the telephone handset including: a U-shaped securing member having spaced legs for securing said sheath member to said handset; and means for reinforcing said U-shaped securing member, said reinforcing means extending beyond the inner edges of the legs of said U-shaped securing member into the space between said legs
and means adapted to secure the telephone handset to the strength member.

25. In combination:
an armored cord for use in connecting a telephone handset to a telephone housing, the telephone handset having a receiver section, a transmitter section, a yoke section connecting the transmitter and receiver sections and means for securing the sheath member of an armored cord to the telephone handset, the yoke and receiver sections having lower walls which in the region of interconnection of aid yoke and receiver sections form a curved lower wall section, the armored cord comprising: a flexible, armored outer sheath member for extending between the handset and the telephone housing; a strength member extending in the interior and over the length of the sheath member; and a number of conductors disposed within said sheath member for extending between said telephone handset and the telephone housing;
and means for securing the strength member to the telephone handset, said securing means including a resilient means for providing resilient engagement of the strength member with the securing means and a surface which engages the telephone handset along said curved lower wall section formed by the lower walls of said yoke and receiver stations and which is curved to follow the curvature of said curved lower wall section.

26. The combination of claim 25 wherein:
the strength member includes an end termination which is adapted to be situated in said handset when said strength member is inserted in said handset;
and said connecting means further includes a stop surface for engaging said end termination.

27. The combination of claim 26 wherein:
said connecting means includes: a retainer clip having a laterally extending end wall facing said end termination and whose surface forms said stop surface, said end wall being provided with an aperture through which said strength member passes, and first and second longitudinally extending side walls at the lateral ends of said end wall, the lower ends of said first and second side walls defining the curved surface of said connecting means which engages and follows the curvature of said curved lower wall section.

* * * * *

UNITED STATES PATENT AND TRADEMARK OFFICE
CERTIFICATE OF CORRECTION

PATENT NO. : 4,837,815

DATED : June 6, 1989

INVENTOR(S) : Rudolf P. Brancati

Page 1 of 4

It is certified that error appears in the above-identified patent and that said Letters Patent is hereby corrected as shown below:

The title page should be deleted to appear as per attached title page.

Sheets 1, 2 and 3 should be deleted to be replaced with sheets 1 and 2 as shown on the attached sheets.

Col. 1, line 63, delete ",".
Col. 2, line 60, "those" should read --whose--.
Col. 3, line 21, after "present" insert --invention--.
Col. 6, line 45, "causes" should read --cause--.
Col. 8, line 44, "aid" should read --said--.

Signed and Sealed this

Twenty-seventh Day of February, 1990

Attest:

JEFFREY M. SAMUELS

Attesting Officer     Acting Commissioner of Patents and Trademarks

United States Patent [19]

Brancati

[11] Patent Number: 4,837,815
[45] Date of Patent: Jun. 6, 1989

[54] ARMORED CORD HANDSET
[75] Inventor: Rudolf P. Brancati, Richmond Hill, N.Y.
[73] Assignee: Nynex Corporation, New York, N.Y.
[21] Appl. No.: 879,085
[22] Filed: Jun. 26, 1986
[51] Int. Cl.⁴ .................... H04M 1/15; H04M 1/03; H04R 1/06
[52] U.S. Cl. .................... 379/438; 379/428; 379/433; 439/451
[58] Field of Search ............ 174/69 R, 70 R, 73 R, 174/75 F, 40 TD, 45 TD, 102 R, 109; 379/428, 433, 437, 438, 451; 439/447, 448, 449, 451, 474, 816, 840, 841

[56] References Cited

U.S. PATENT DOCUMENTS

| | | | |
|---|---|---|---|
| 454,486 | 6/1891 | Lieb | 174/45 TD |
| 896,700 | 8/1908 | Atwood | 174/105 R |
| 2,220,393 | 11/1940 | Bylander | 174/70 R |
| 3,290,429 | 12/1966 | Prescott et al. | 174/102 R |
| 3,377,442 | 4/1968 | Foster, Jr. | 379/438 |
| 3,674,915 | 7/1972 | Pritchard | 174/102 R |
| 3,917,369 | 11/1975 | Sevec et al. | 174/69 |
| 4,130,740 | 12/1978 | Cogan | 379/433 |
| 4,178,490 | 12/1979 | Boenecke | 379/433 |
| 4,259,544 | 3/1981 | Litauer | 174/102 R |
| 4,319,095 | 3/1982 | Cogan | 379/433 |
| 4,518,830 | 5/1985 | Drexler et al. | 379/438 |

FOREIGN PATENT DOCUMENTS

| | | | |
|---|---|---|---|
| 502780 | 8/1979 | Australia | |
| 668040 | 11/1938 | Fed. Rep. of Germany | 174/40 TD |
| 608909 | 1/1979 | Switzerland | 174/69 |

Primary Examiner—Jin F. Ng
Assistant Examiner—Randall P. Myers
Attorney, Agent, or Firm—Robin, Blecker & Daley

[57] ABSTRACT

An armored cord and handset wherein the strength member of the armored cord is secured to the handset through resilient means and the sheath member of the armored cord is secured to the handset via a securing member which is provided with reinforcing means.

27 Claims, 2 Drawing Sheets